G. A. HYDE, Sr. & G. A. HYDE, Jr.
GAS PRESSURE REGULATOR.
No. 10,656. Reissued Nov. 3, 1885.
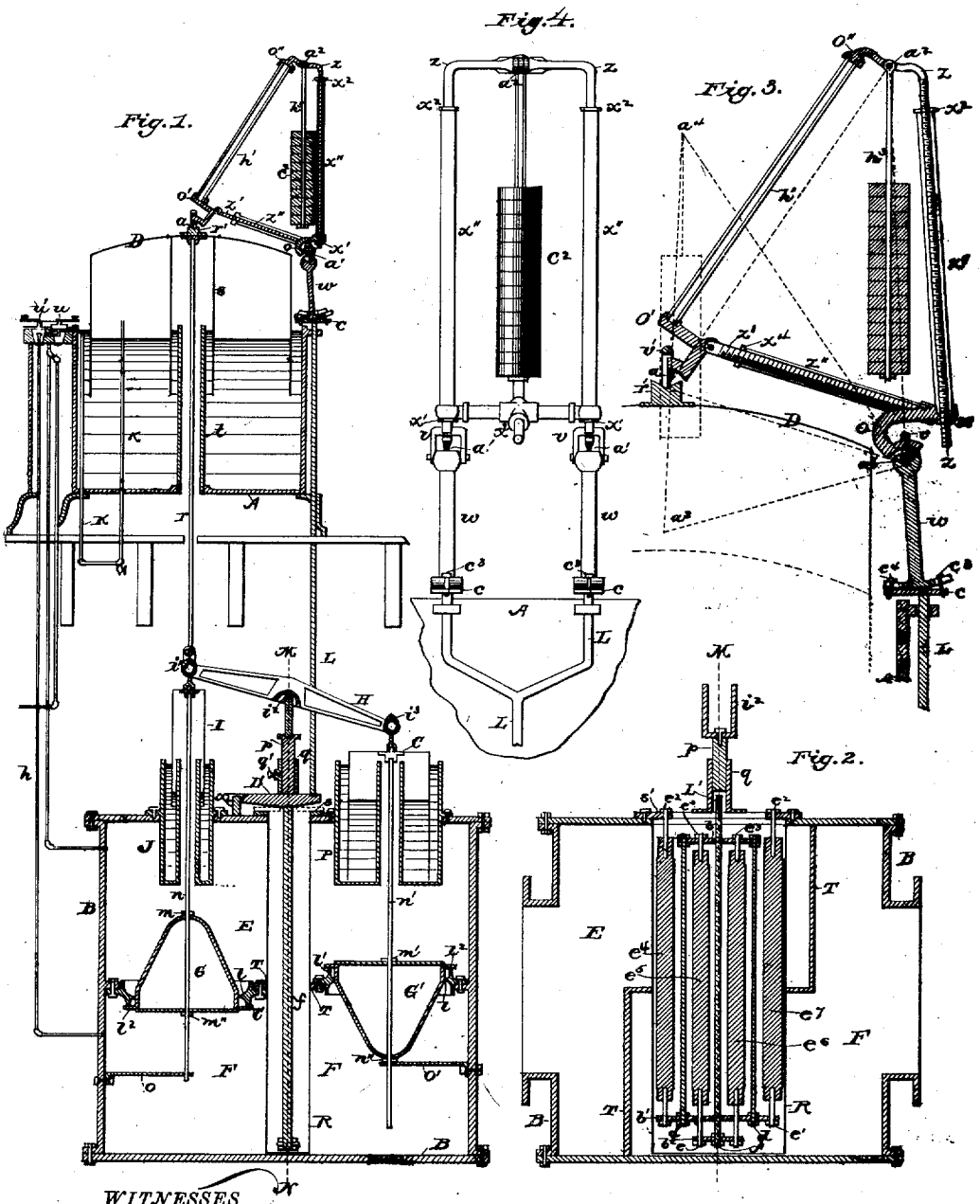
WITNESSES
N. N. Mortimer.
Arthur Dyrenforth.
INVENTOR
Gustavus A. Hyde, Sr.
Gustavus A. Hyde, Jr.
by R. J. Dyrenforth,
their Attorney

UNITED STATES PATENT OFFICE.

GUSTAVUS A. HYDE, SR., OF CLEVELAND, OHIO, AND GUSTAVUS A. HYDE, JR., OF EAST SAGINAW, MICHIGAN.

GAS-PRESSURE REGULATOR.

SPECIFICATION forming part of Reissued Letters Patent No. 10,656, dated November 3, 1885.

Original No. 297,692, dated April 29, 1884. Application for reissue filed October 5, 1885. Serial No. 179,026.

*To all whom it may concern:*

Be it known that we, GUSTAVUS A. HYDE, Sr., and GUSTAVUS A. HYDE, Jr., citizens of the United States, residing at Cleveland, in the county of Cuyahoga and State of Ohio, and at East Saginaw, in the county of Saginaw and State of Michigan, respectively, have invented certain new and useful Improvements in Gas-Pressure Regulators, of which the following is a description.

This invention relates to gas governors or regulators for street-mains and other large supply-pipes.

It is a well-known fact that as the consumption of gas increases or decreases the flow of gas is accelerated or retarded, and the friction thereby created in the pipes is increased or lessened; and to counteract the variation in friction so caused, and to insure a nearly uniform pressure to the more distant consumer, it is found necessary to vary the pressure at the governor. It is also known that in localities where the gas is consumed at a higher level than the governor, the difference in pressure resulting from the difference in elevation is affected by the variation in the temperature of the gas. Where telescoping gas-holders are in use, the pressure is very materially increased when the two sections couple, and the reverse result is obtained in an equal degree when they uncouple. The gas-holder, weighing less in than out of water, also affects the pressure. The friction produced by the flow of gas from the gas-holder to the governor also decreases the pressure at the governor as the velocity increases. These fluctuations of pressure from these causes tend to derange the otherwise correct working of the governor by forcing more gas through the valves when at high initial pressure, thereby temporarily increasing the resultant pressure. This increased resultant pressure in turn, in a governor with an attachment for automatically increasing and decreasing the weight on the valve, throws off a part of the weight. Therefore, when the initial pressure is increased, the resultant pressure is to a certain extent decreased, and the reverse result is true of a reverse fluctuation in the initial pressure.

The object of the present invention is to insure an automatic and a more regular government than has heretofore been accomplished of the passage or flow of the gas from the gas-holder or general-supply station to the consumer under the many deranging influences which naturally occur, to guard against fluctuations in pressure in the supply-pipe caused by deranging the governor by the initial pressure, and to guard against any variation in the pressure through variation in the temperature of the gas.

With these objects in view the invention consists, essentially, in two connected valves joined by a suitable connection, whereby they are caused to move in opposite directions to seats provided in the diaphragm which separates the inlet from the outlet opening; in a casing in which the said valves are situated and through which the gas passes, the said valves being connected with and adapted to be operated by suitable intermediate mechanisms, which join them to a governing device by which their position is regulated when the initial pressure is applied, and being also connected with a device whereby the deranging influence of difference in temperature of the gas is neutralized; and, further, the invention consists in various details of construction whereby the successful operation of the several correlative parts is perfected with a minimum amount of friction upon the different bearing-surfaces.

In the accompanying drawings, forming a part of this specification, like letters of reference indicate corresponding parts.

Figure 1 represents a central vertical section of an apparatus embracing our improvements. Fig. 2 represents a vertical detached section of the casing B, taken through the line M N of Fig. 1. Fig. 3 represents an enlarged detached section of the parts designated by letters $a$ $a'$ $a^2$ of Fig. 1, and Fig. 4 represents a rear view of the same.

B is a casing placed so that the inlet E is in connection with the supply of gas from the gas-holder, and the outlet F is connected with the main distributing-pipe to the consumers. The valves G G′ are preferably cone-shaped, of similar construction, and both suspended from a balancing-bar, H, by means of depending rods $n$ $n'$. The fulcrum of the balancing-bar H is made adjustable by means of the rod $p$, upon the upper end of which it has its bearing, which rod slides in the hollow standard, and has its vertical position regulated by a set-screw passing through the shell of the said casing. The points of bearing at each end and the middle of the balancing-bar are preferably sharp blades, in order that no friction may result at these points from the operation of the device. The valves G G′ are connected to the float D through the medium of their supporting-rods, the balancing-bar H, and the rod $r$, which last is connected at its lower end to the said balancing-bar and at the other to the float, and is moved up or down with the float in the operation of the device. The float D is placed within a suitable casing, A, which is kept nearly filled with water, and this float is caused to rise and fall to effect the opening and closing of the valves by means of the pressure of the gas, which is conducted to the under side of the said float through the pipe $h$, valves $u$ and $u'$, and pipe $k$. The rod $r$ passes up through a tube secured in the casing A. The rods $n$ $n'$ are each supplied with water-seals, in order that they may slide freely through openings in the casing, and at the same time escape of gas be prevented. When an increased initial pressure of gas is conveyed through the apertures, caused by the partial opening of the valves G and G′, the resultant pressure is momentarily increased, and this increased pressure, conveyed through pipes $h$ and $k$, lifts the float D. The tendency of this is to raise the valve G and depress the valve G′, and in order to prevent a considerable resistance of this force, the tendency of which would be to close the valves, we provide the valve G′ with a larger sealing-tubing than the valve G, in order that the valve may not be closed by increased initial pressure.

$o$ and $o'$ are guides for valve-rods $n$ and $n'$, to keep valves G and G′ from coming in contact with the gage-rings $l$ $l$.

$l'$ and $l'$ are sharp-edged seats for the projecting flanges $l^2$ $l^2$ of the valves G G′ to rest against when closed.

In Figs. 1 and 2, T is a partition separating the inlet-chamber E from the outlet-chamber F.

R is a sheet-metal casing, flanged at the upper end, and suspended from the top side of the casing B, and passing through the partition T. On the inside it has no gas-connection with the chambers E and F.

L′ is a lever pivoted with pillar $x$, resting on rod $f$, and sustaining rod L, which in turn sustains the plate $c$.

$e$, $e'$, $e^2$, and $e^3$ are bolts attached to wooden rods $e^4$, $e^5$, $e^6$, and $e^7$.

$e$ $e$ are also secured to plate $b^2$, $e'$ $e'$ to plate $b'$, $e^3$ $e^3$ to plate $s'$, and $e^3$ $e^3$ to plate $b$. Rod $f$ is secured to plate $b^2$, and passes freely through plates $b$ and $b'$, and bolts $e$ $e$ pass freely through the plate $b'$. Rods $f$, $d$, and $d$ are metal. The rod $f$ is secured to the plate $b^2$, and $d$ $d$ are secured to plates $b$ and $b'$.

$a$ and $a'$ and $a'$ are V-shaped pointed supports resting in V-shaped bearings $r'$ and $w$ $w$. The bearing $r'$ is in the center of the float D, and $w$ $w$ are standards laterally adjustable on plates $c$ $c$ by screw-bolts $c^3$ and $c^4$, as shown. The arm $h'$ is a tube permanently attached to the fittings O′ O″. The arms $x''$ $x''$ $z''$ are tubes inclosing threaded rods $z$ $z$ and $z'$, respectively, which are provided with nuts $x'$ $x'$, $x^2$ $x^2$, $x^3$, and $x^4$, as shown. The rod $z'$ is pivoted to the fitting O′, as shown. The pendent rod $h^3$, with the weight $c^2$, is pivoted with the fitting O″ and the threaded rods $z$ $z$ at $a^2$, as shown. The stops $v$ $v$ and $v'$ are to prevent the pointed supports $a$, $a'$, and $a'$ from lifting out of their bearings $r'$, $w$, and $w$.

In the operation of the device, assuming that the valves G and G′ are open, and the float D resting on the bottom of the casing A, gas is let into the inlet E, and passes through the openings made for the valves G and G′, and passes out through the outlet-opening F. The pressure of the gas conveyed through the pipe $h$, regulating-cock $u$ $u'$, and pipe $k$ lifts the float D and throws the triangular weight-adjuster $a$ $a'$ $a^2$ from its position $a^3$ $a^4$ to its position $a$ $a^2$, and also lifts the valve G and depresses the valve G′ to their positions, as shown. The consumption of gas then commencing, the pressure of gas below the valves G and G′ is decreased in the outlet-chamber F, and also in the float D through the pipes $h$ and $k$, causing it to fall, and this in turn causes the opening of the valves G and G′, and allows gas to pass from chamber E to chamber F to meet the demand for gas, and at the same time the triangle is depressed at the point $a$, causing a movement of the pendulum-weight $h^3$ toward $a^4$, and resulting in applying weight on the float D, and keeping the valves G and G′ open. When the consumption of gas decreases, the reverse action is had, the valves G and G′ being closed and the weight thrown off, the result being not only to open and close the valves automatically, as required, but also to increase and decrease the pressure to the extent of the resisting friction in the distributing-pipes.

To counteract the disturbing influence of variation in the temperature of the gas, we have designed the apparatus shown in Fig. 2. In the passage of gas from chamber E to F its temperature is imparted to the metal casing R and the rods contained therein. The rods $e^4$, $e^5$, $e^6$, and $e^7$, being of wood, are not affected lengthwise by the temperature; but the rods $f$, $d$, and $d$, being of metal, are affected by the temperature. If the temperature is increased, the rods $f$, $d$, and $d$ are expanded, and plate $b'$, being suspended on the wooden rods $e^4$, $e^7$, $d$, and $d$, will raise the plate $b$ and consequently the wooden rods $e^5$ and $e^6$, and plate $b^2$ will be raised, and in turn the rod $f$, being attached to the plate $b^2$, will also be raised. The expansion or raising imparted to lever L′, as shown, is thereby increased in its effect on the rod L by having lever L′ pivoted with the standard $x$, as shown. The raising of the rod L causes a movement of the pendulum-weight $h^3$ toward $a^4$, resulting in adding weight to the float D and opening the valves G and G′, and increasing the pressure the same amount that it had been reduced by the raising of the temperature of the gas.

The fact of the affecting of the pressure of the gas in the manner as above mentioned has, we believe, never before been recognized, and this device, constituting a species of thermostat, is the first, to our knowledge, that has ever been designed for that purpose.

The two valves G and G′ are used in connection, by means of the balance-bar H, for the purpose of balancing their weight, thus allowing the use of a much smaller float D than is usual, and also to balance the action of the force of the gas as it passes rapidly by and over the valves, and to balance the effect of the constantly-changing pressure above and below either valve. This arrangement of valves, in connection with the V-shaped bearings $i'$ $i^2$ $i^3$, we regard as an important element in the free action of the governor, and it forms an important part of our invention.

Having thus described our invention, what we claim as new, and desire to secure by Letters Patent, is—

1. A gas-pressure governor or regulator consisting of the balancing valves arranged in the line of travel of the gas, and the float moved by the pressure of gas and operating the valves, substantially as described.

2. In a gas-governor, the combination, with the float, of a regulating device consisting of the triangle and attached weight, substantially as described.

3. A gas-pressure governor or regulator consisting of the balancing valves arranged in the line of travel of the gas, the float moved by the pressure of the gas and operating the valves, and the movable frame carrying the swinging weight, the whole operating substantially as set forth.

4. A gas-pressure regulator or governor consisting of the valves, the operating-float arranged substantially as described, the said valves being supported by a balancing-bar, to which they are connected by suitable rods in such manner as to move simultaneously in opposite directions, the said rods being provided with water-sealing tubes, the one to be forced down into the water to close the valves having a greater bearing-surface than the other, as and for the purposes set forth.

5. A gas-pressure regulator consisting of the two valves connected by the balancing-bar and suitable rod-connections provided with water-seals, the said balancing-bar being sustained by a post which is vertically adjustable, the operating-float, and suitable gas-connections between the gas-supply and the float, substantially as described.

6. In a gas regulator or governor, the combination, with a weight upon the float, of a thermostatic device in the line of travel of the gas, operating to increase and diminish the pressure of the weight upon the float in proportion to the temperature of the gas, substantially as described.

7. In a gas-pressure regulator or governor, the combination, with the casing B, of the balancing valves arranged therein, the casing R, containing the expansion-rods, the operating-float, the triangular frame carrying the swinging weight, and suitable means for respectively connecting the valves and float and the triangle and expansion-rods, the whole operating substantially as and for the purpose set forth.

8. In a gas-pressure governor or regulator, the adjustable weight $c^2$, together with the vibrating pendent rod $h^3$, suspended from the triangular adjustable frame O O′ $z$ $x'$, having V-shaped or sharp-pointed supports $a$ $a'$ $a'$, secured in V-shaped bearings $r'$ $w$ $w$ by stops $v$ $v$ $v'$, in combination with the float D, rods $r$, $n$, and $n'$, and valves G and G′, substantially as shown, and for the purposes set forth.

9. The two valves G and G′, having projecting rings $l^2$ $l^2$, sharp-edged gage-rings $l$ $l$, and sharp-edged seats $l'$ $l'$, in combination with rods $n$, $n'$, and $r$, tubings I and C, balancing-bar H, float D, triangular adjustable frame O O′ $z$ $x'$, vibrating pendent rod $h^3$, and adjustable weight $c^2$, substantially as shown, and for the purposes set forth.

10. The tubing C and its annular tubing P, having greater diameter than the tubing I and its annular tubing J, in combination with the rods $n$, $n'$, and $r$, balancing-bar H, valves G and G′, with float D, triangular adjustable frame O O′ $z$ $x'$, and vibrating pendent rod $h^3$, and adjustable weight $c^2$, substantially as shown, and for the purposes set forth.

11. The balancing-bar H, fulcrumed at its center and connected with rods $n$, $n'$, and $r$, with sharp-edged bearings $i'$ $i^2$ $i^3$, and having an adjustable fulcrum-pillar, $p$, in combination with tubings I and C, valves G and G′, float D, and triangular adjustable frame O O′ $z$ $x'$, substantially as described.

12. A varying temperature-regulator composed of alternate wood and iron rods $e^4$ $d$ $e^5$ $f$ $e^6$ $d$ $e^7$, inclosed in casing R and connected to lever L′ and rod L, in combination with triangular adjustable frame O O′ $z$ $x'$, float D, rods $r$, $n$, and $n'$, valves G and G′, tubings I and C, and balance-bar H, substantially as shown, and for the purpose set forth.

In testimony whereof we have hereunto set our hands in the presence of two subscribing witnesses.

GUSTAVUS A. HYDE, SR.
GUSTAVUS A. HYDE, JR.

Witnesses to the signature of Gustavus A. Hyde, Sr.:

CHAS. H. BEARDSLEE,
F. B. CHAMBERLAIN.

Witnesses to the signature of Gustavus A. Hyde, Jr.:

J. H. SLEETH,
F. LAWRENCE.